(12) United States Patent
Li

(10) Patent No.: US 9,934,439 B1
(45) Date of Patent: Apr. 3, 2018

(54) METHOD, SYSTEM FOR REMOVING BACKGROUND OF A VIDEO, AND A COMPUTER-READABLE STORAGE DEVICE

(71) Applicant: FRAMY INC., Grand Cayman (KY)

(72) Inventor: Yu-Hsien Li, Taipei (TW)

(73) Assignee: FRAMY INC., Grand Cayman (KY)

( * ) Notice: Subject to any disclaimer, the term of this patent is extended or adjusted under 35 U.S.C. 154(b) by 0 days.

(21) Appl. No.: 15/365,259

(22) Filed: Nov. 30, 2016

(30) Foreign Application Priority Data

Sep. 12, 2016 (TW) .............................. 105129637 A

(51) Int. Cl.
*G06K 9/00* (2006.01)
*G11B 27/036* (2006.01)
*H04N 9/87* (2006.01)

(52) U.S. Cl.
CPC ..... *G06K 9/00744* (2013.01); *G06K 9/00718* (2013.01); *G11B 27/036* (2013.01); *H04N 9/87* (2013.01)

(58) Field of Classification Search
CPC ........... G06K 9/00744; G06K 9/00718; G11B 27/036; H04N 9/87
See application file for complete search history.

(56) References Cited

U.S. PATENT DOCUMENTS

| | | | | |
|---|---|---|---|---|
| 9,256,922 | B2 * | 2/2016 | Zagaynov | ............. G06T 3/4053 |
| 2005/0180659 | A1 * | 8/2005 | Zaklika | ..................... G06T 5/00 |
| | | | | 382/309 |
| 2009/0097765 | A1 * | 4/2009 | Kimura | .................... G06K 9/48 |
| | | | | 382/243 |
| 2014/0147003 | A1 * | 5/2014 | Li | ...................... G06K 9/00234 |
| | | | | 382/103 |
| 2014/0201126 | A1 * | 7/2014 | Zadeh | .................... G06K 9/627 |
| | | | | 706/52 |
| 2015/0055828 | A1 * | 2/2015 | Zhao | ....................... G01S 17/50 |
| | | | | 382/103 |

FOREIGN PATENT DOCUMENTS

| | | |
|---|---|---|
| CN | 1312638 C | 4/2007 |
| CN | 102915544 B | 4/2015 |
| TW | 200809696 A | 2/2008 |

* cited by examiner

*Primary Examiner* — Mishawn Hunter
(74) *Attorney, Agent, or Firm* — Li & Cai Intellectual Property (USA) Office

(57) ABSTRACT

The disclosure is related to a method and a system for removing background of a video. One of the objectives of the method and system is to extract a motion image object from a video. In the method, a plurality of frames is first retrieved from the video. An image processing approach is performed to recognize image features of every frame. A plurality of color blocks for every frame are obtained through the image processing scheme. A variance among the pixels in every color block of two continuous frames can be obtained by a comparison computation, so as to form a color block variance. The color block variance allows the system to determine a motion target object as well as its image contour. The blocks excepting the blocks of the target object are set as transparent blocks. Therefore the background relative to the target object can be removed.

18 Claims, 13 Drawing Sheets

METHOD, SYSTEM FOR REMOVING BACKGROUND OF A VIDEO, AND A COMPUTER-READABLE STORAGE DEVICE

BACKGROUND OF THE INVENTION

1. Field of the Invention

The present invention is generally related to a technique of image processing, in particular to a method and a system for separating foreground and background of a video, and a related computer-readable storage device.

2. Description of Related Art

In general, most discussions about the function of background elimination are for still images. For example, a magic wand tool in an image processing application is provided for a user to operate this tool to select a block to be transparent. The application then eliminates the block selected by the magic wand tool. It sometimes requires several repetitions to utilize this tool to completely remove the blocks, e.g. the background, other than a target object chosen in the still image. Further, a path curve tool is provided to help the user to sketch an edge of an image object for removing its background using a computer mouse or a stylus. It is noted that the path curve tool requires multiple interval points for sketching an outline of the image. At last, the regions outsides the outline of the image are removed.

For removing background of a video, a motion object with a changeable background should be prepared according to one of the conventional technologies. For example, taking a movie, a motion object is required to be firstly captured in front of a green screen or other single-colored screen. After that, post-production is used to take the video clip and easily change its background, or make it over another image.

Rather than the video clip produced in front of the green screen in the prior technology, a video processing application may be used to extract the moving object out of the existing video according to another conventional technique. However, the prior application must remove the background frame by frame from the video using the prior technique even though it is a 30 frame-per-second film. The frames without backgrounds are recombined so as to obtain the target object whose background images have been removed.

SUMMARY OF THE INVENTION

In view of the complicated post-production being required to remove the background from a video in the conventional technology, a system and a method for removing the background of a video in accordance with the present invention in the disclosure is provided. In the method, an image processing process is incorporated to resolve a plurality of color blocks from the video. Then the variance among the color blocks gives the information to separate the foreground and the background of each frame of the video. The motion target object can then be alone retrieved from the video.

In one embodiment of the present invention, the method for removing the background of the video includes a step for receiving a video from a memory, and extracting a plurality of frames from the video. The method goes on analyzing the correlation among the pixels for acquiring the image feature of every frame. The image feature acts as the reference to render multiple color blocks for every frame. The color blocks having their unique identification data are saved to the memory. The pixels in each color block are associated with the corresponding color block using the identification data. The differences between the adjacent pixels in each color block can be computed for obtaining a variance for each color block. The variance of every block in a preceding frame and a following frame is referred to determine a target object. The contour of the target object over the color blocks covered by the target object can be obtained. The other color blocks other than the color blocks of the target object are set to be the transparent blocks.

In one further aspect of the present invention, the method for implementing the method described above includes one or more processing units, an input unit for receiving a video, an output unit for outputting the video clip whose background is removed, and a memory for storing an instruction set.

The instruction set stored in the memory unit is executed by the one or more processing units for performing the steps such as receiving a video; extracting a plurality of frame of the video; analyzing image features of each frame for acquiring correlation between adjacent pixels in each frame; in response to the image feature for every frame separating every frame for forming multiple color blocks, in which every color block includes multiple pixels, every pixel value is associated with an identification data for every correlated color block; computing differences of the pixels between a preceding frame and a following frame, so as to obtain a variance for every color block; determining a target object in response to the variance for every color block, and acquiring the color blocks covered by the target object or a contour of the target object; and setting the color blocks other than the color blocks of the target object as transparent blocks, so as to form a video clip without a background.

DETAILED DESCRIPTION OF THE PREFERRED EMBODIMENTS

The present invention will now be described more fully with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The disclosure is related to a system and a method of image processing that is utilized to separate a background and a foreground of a video. In the method, a target object and its background in the video can be identified, and next the background can be removed. One of the objectives of the present invention is to take a target out of an existing video by removing the background. A video clip with a transparent background is therefore created. This video clip can be combined with any other background.

In particular, a series of automatic computer sequences are used to create a motion picture, e.g. the video clip, with the transparent background. In the method, the variance of each color block between a preceding frame and a following frame in the video is taken under consideration. The method is able to consider the circumstance under which the video is produced. In general, the color block or a combination of color blocks with a relatively large variance than other blocks can be regarded as the target object in the video. However, in some cases, the color block or a combination of color blocks with a relatively small variance can also be the target object. Because the method is applicable to the video with dynamic foreground and background, it is suitably adapted to a video made by a mobile device performing a related software program.

The following schematic diagrams show a circumstance in which a motion object falls in a video, and the video is under a process of the method for removing a background in accordance with the present invention.

Figure 1A:
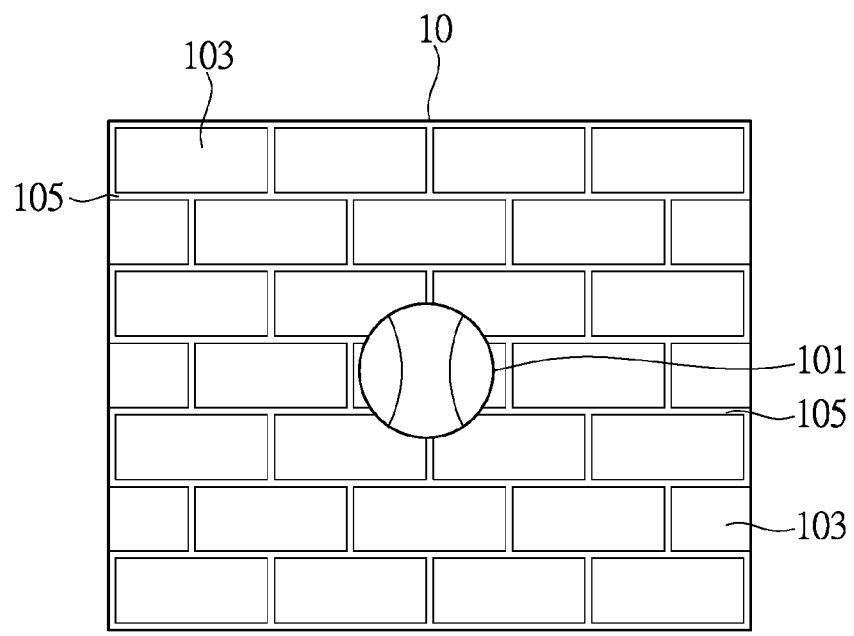
FIG. 1A through FIG. 1C show a schematic diagram depicting a circumstance in which a motion object falls in the video and the motion object is processed by the method in accordance with the present invention.

The video 10 shown in FIG. 1A is a motion picture including a moving object 101, e.g. a falling ball. Further, the background of the video shows a brick wall. The brick wall is formed by an array of square bricks 103 and multiple strip seams 105.

Figure 1B:
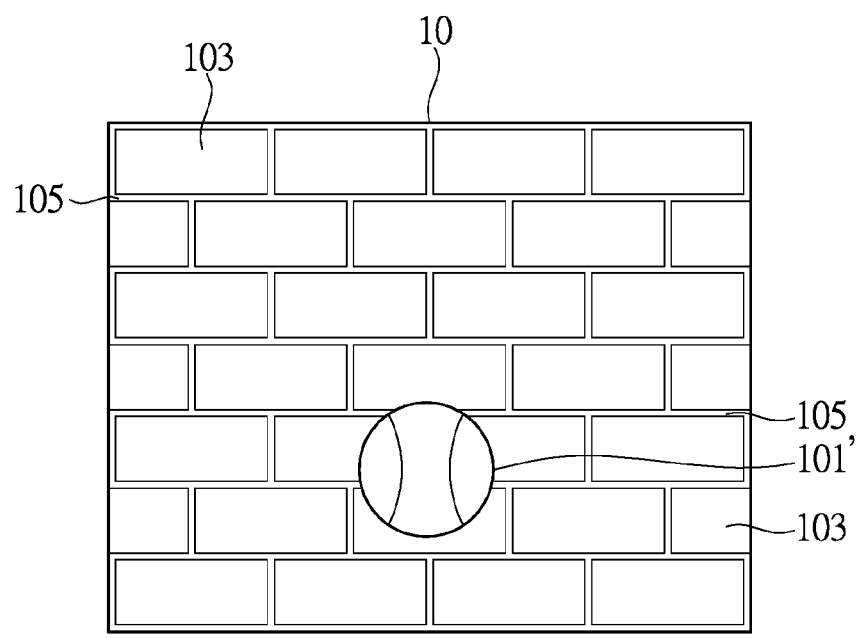

As shown next in FIG. 1B, the video 10 shows an object 101' at the next moment. The object 101' is such as the falling ball that has moved a distance relative to the object 101 of FIG. 1A. The background is still formed by the bricks 103 and the seams 105.

Figure 1C:
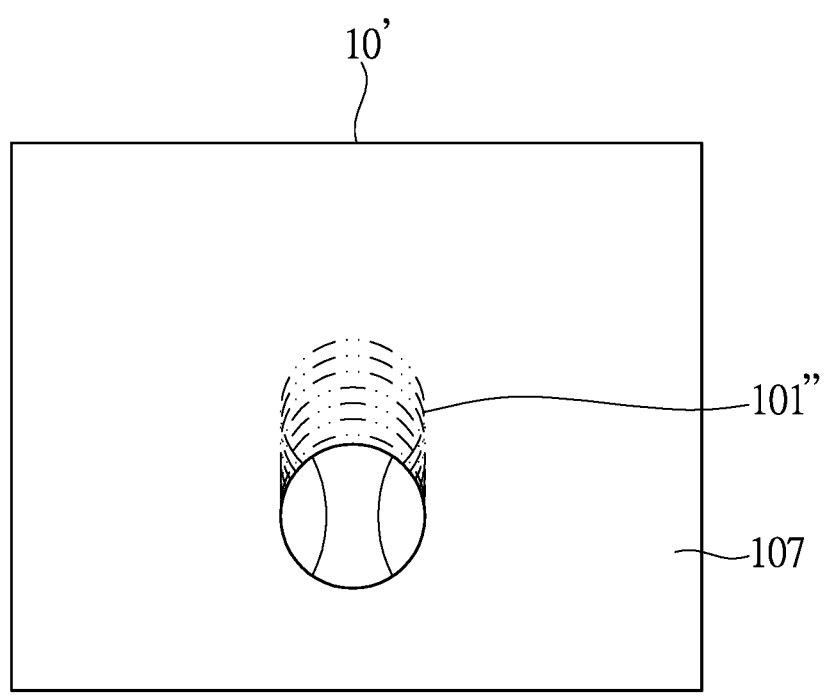

FIG. 1C shows the video 10' whose background has been removed by the method in accordance with the present invention. It appears that the arrayed bricks 103 and the strip seams 105 forming the background have been removed. The video 10' leaves the falling target object 101" without its original background.

In the process of removing the background of the video, the seams 105 among the bricks 103 may be ignored since the strip seams 105 can be regarded as noise relative the big square bricks 103. The main part of the background is the plurality bricks 103, and the bricks can be regarded as a whole color block. Because the background is converted to the whole color block or any other single-color image, the background can be easily configured to be a transparent image 107. The remaining part of the video 10 is the target object 101" that acts as a video clip. The target object 101" can be applied onto any picture acting as its background. The outcome of the process of removing the background of the video creates a film with changeable background similar with a movie clip being produced using the traditional green screen. However, rather than the traditional production of the movie clip, the method of the present invention is especially applied to an existing video. Further, the method of the present invention allows the existing video to be turned to a plurality of color blocks and seeks a contour of a target object in the video when the target object is removed from its original background by an image processing process.

FIG. 2A through FIG. 2D show a series of schematic diagrams depicting an example of removing a background of a video.

Figure 2A:
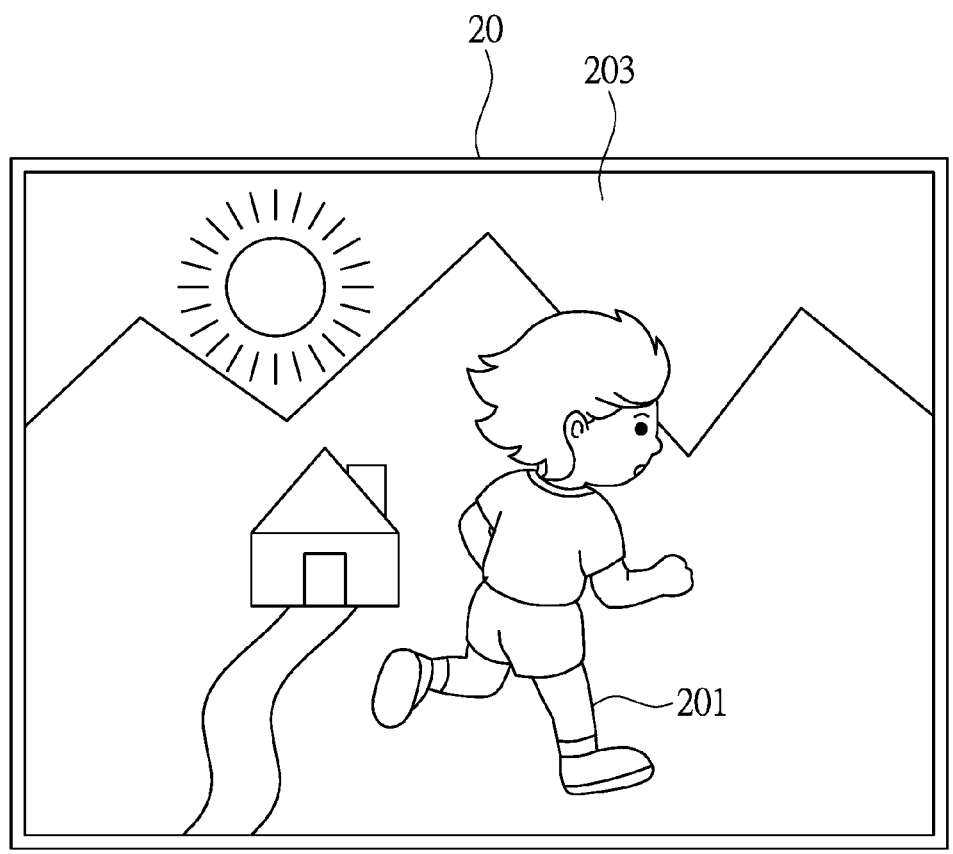
FIG. 2A through FIG. 2E shows another circumstance in which another motion object moves in the video and the background is going to be removed by the process in accordance with the present invention.

FIG. 2A shows a moving object 201 in a video 20. This present example schematically shows the object 201 is a running man, and the background 203 is a landscape. While the video 20 was produced, a camera was controlled to make the video follow the moving object 201. The background 203 in this example should also be a moving scene.

Figure 2B:
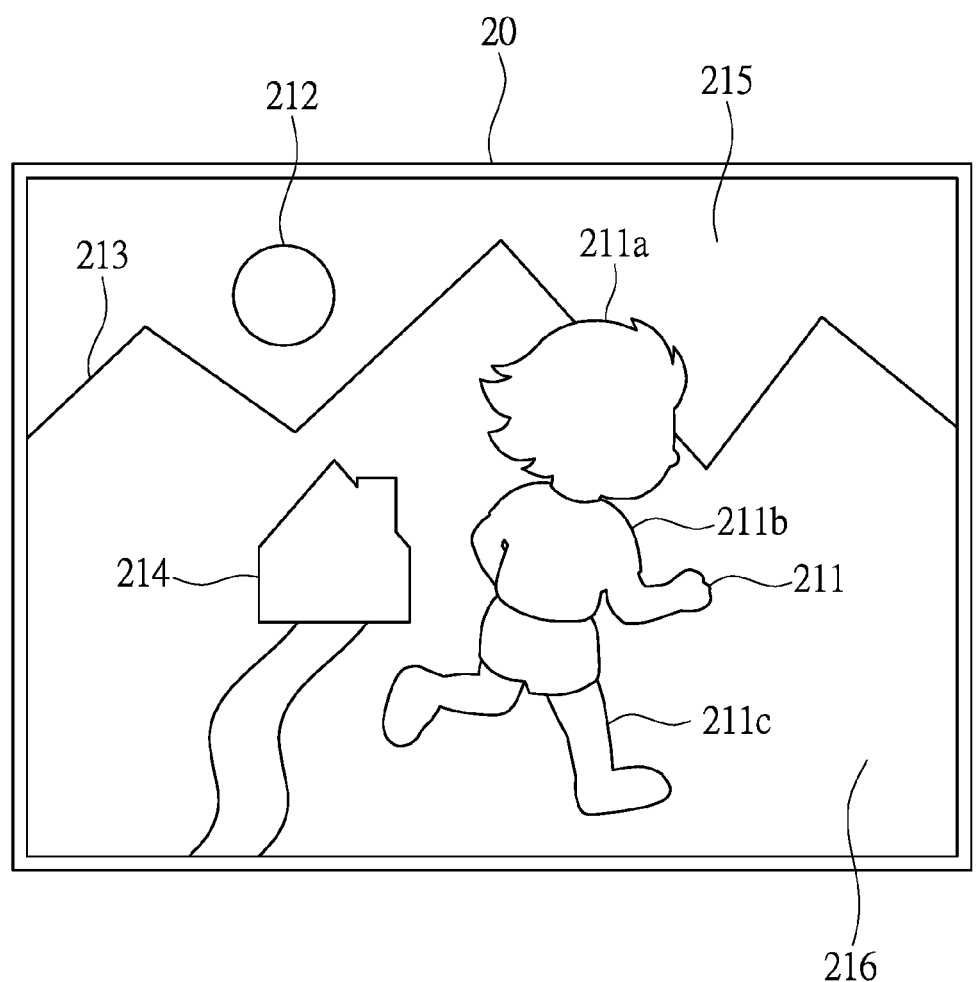

In FIG. 2B, a plurality of frames is first extracted from the video 20. The image information of the pixels in every frame is also obtained. According to the pixel information and a correlation between every two adjacent pixels, the pixels in each frame can be classified to several larger-area color blocks while the small-area details are configured to be ignored. The color blocks 211 including blocks 211a, 211b and 211c, 212, 213, 214, 215 and 216 are therefore formed.

For example, the background shown in FIG. 2A includes several pieces of scenery, such as a mountain, a sun, and a house. The running man is at the foreground. Through the process of removing the background in accordance with the present invention, the color block 211 including the sub-blocks 211a, 211b and 211c, and the other blocks 212, 213, 214, 215 and 216 are formed as shown in FIG. 2B. The formation of every color block has similar image features of pixels through the process of analyzing the correlation between the adjacent pixels. After that, the variance of every color block in the continuous frames can be obtained so as to determine a contour or the color blocks covered by a target object. In the present example, the color block 211 covering the several blocks (211a, 211b, 211c) forms the target object.

Figure 2C:
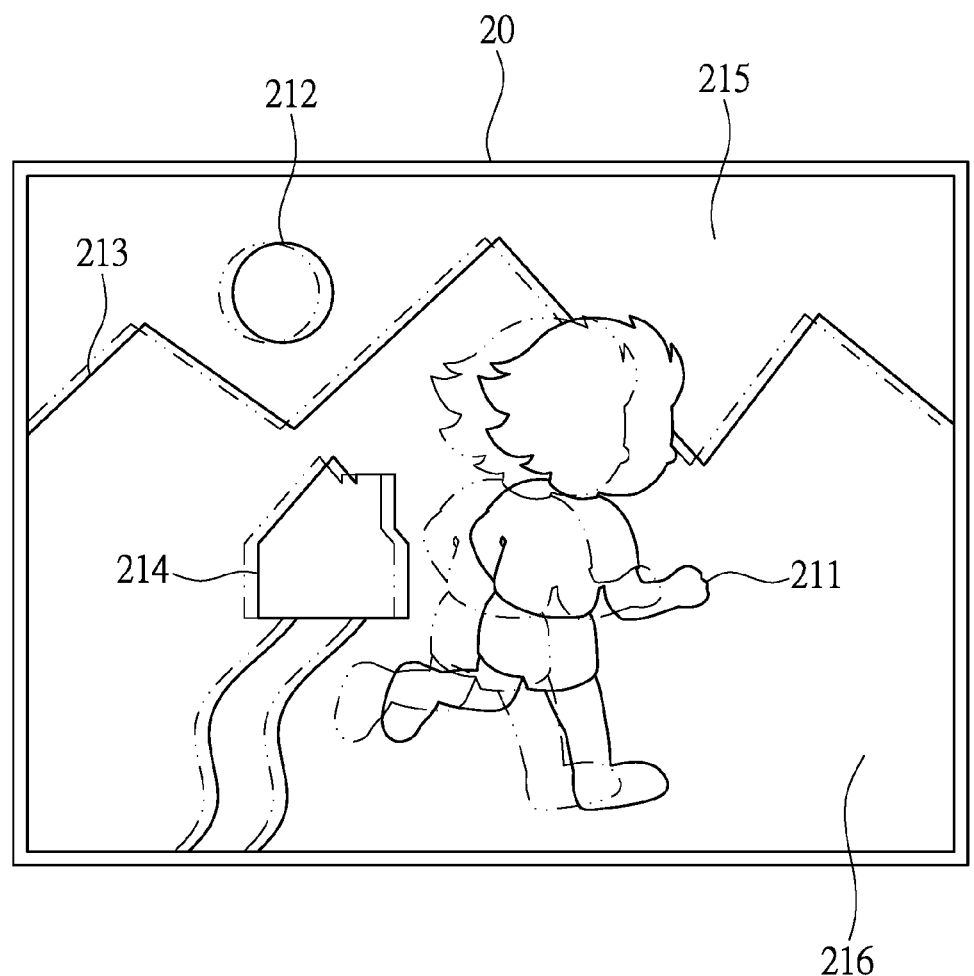

In the step of processing the color blocks, the changes between the preceding frame and the following frame of the video 20 can be found, as shown in FIG. 2C. Every color block in the video 20 has a distance shift, e.g. the dotted lines, between two continuous frames. This displacement acts as a reference to compute the variance of every color block between the frames, e.g. a preceding frame and a following frame. It is noted that the original video being produced has a shaking problem because it is unavoidable that the handheld mobile device shakes and causes pieces in the video to have displacement when it is used to take a video. Therefore, both the foreground image and the background image have the displacement problem. However, the overall displacement will be under consideration in the process of removing the background of the video when the variance including the displacement of every color block is computed. Because of the overall displacement of every frame in the video, the shaking mobile device does not affect the result that the background is removed.

After the change of the pixel within every color block between a preceding frame and in a following frame can be inspected, the variance of every color block can also be computed. For example, an average of changes of the pixels in every color block is computed. The average can be any other statistical value. Further, a threshold is introduced to inspect if the difference between every two adjacent color blocks between the preceding frame and the following frame exceeds the threshold. The adjacent color blocks can be integrated into one color block when the difference between the two adjacent color blocks is within the threshold. The present example shows the three separate color blocks 211a, 211b and 211c in the original state are regarded as one color block 211 because their displacements between the two adjacent color blocks are within the threshold.

Figure 2D:
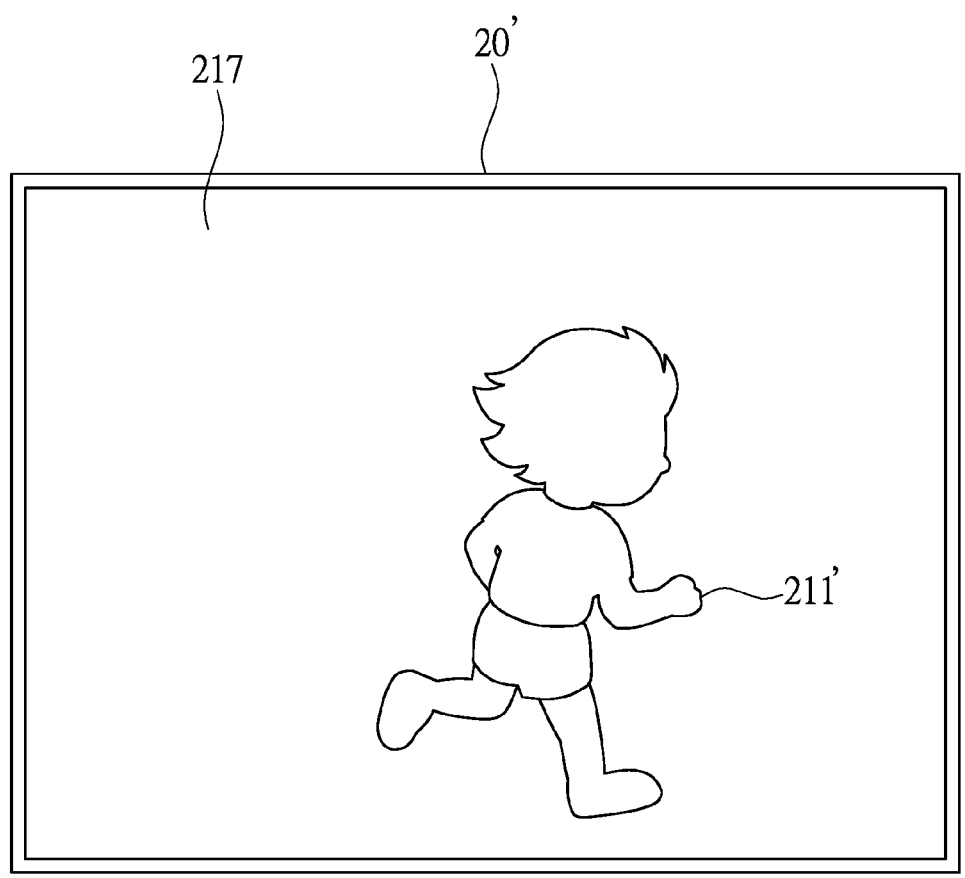

FIG. 2D exemplarily shows a video 20' without a background. In the present example, the mentioned color blocks 212, 213, 214, 215 and 216 act as the background 217 of the original video 20 when they have lower dynamics, e.g. smaller variances. The dynamic of the color block 211 has a relatively high dynamic as compared with the other color blocks 212, 213, 214, 215 and 216. The color block 211 is determined to be a target object 211'. After this target object 211' covering a certain area of the video 20 has been confirmed, the above steps can be repeated for acquiring a contour of the target object 211' and the color blocks covered by the target object 211' from the frames in the original video 20. The moving target object 211' can be extracted from the background 217. The color blocks covered by the dynamic target object 211' act as a whole block. The target object 211' can be applied to another background image than its original video 20.

Figure 2E:
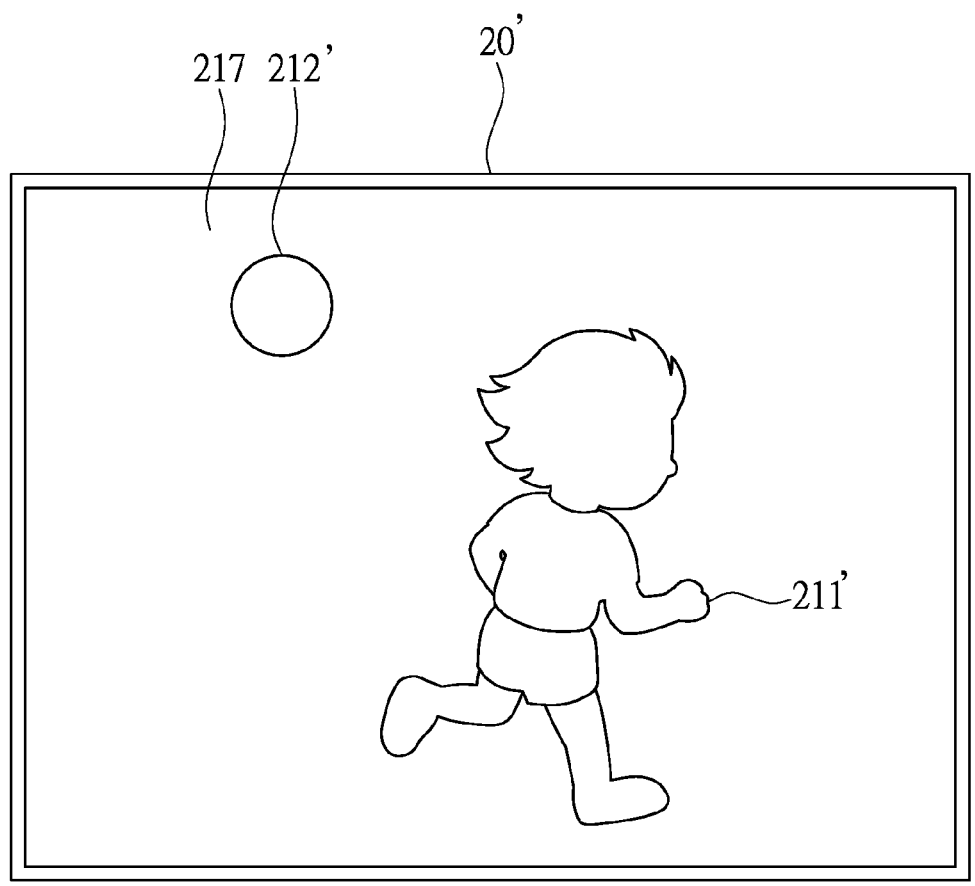

When the target object 211' has been extracted from the video, the system further provides a user interface allowing the user to perform the subsequent operation. FIG. 2E exemplarily shows the user interface operatively provided from a touch-sensitive display or a specific device. The user interface allows the user to edit the target object 211'. For example, the user can use his gesture or an input method, e.g. an air gesture, to restore a color object 212' which has been removed by the above process and make it as part of the target object 211'. Further, the user interface also allows the user to delete one of the color blocks constituting the existing target object 211'. The user interface is referred to the schematic diagrams shown in FIG. 8A and FIG. 8B. The exemplary example shows the color block 212' to be regarded as a part of the background is re-selected to be one of the blocks of the target object 211'.

Figure 3:
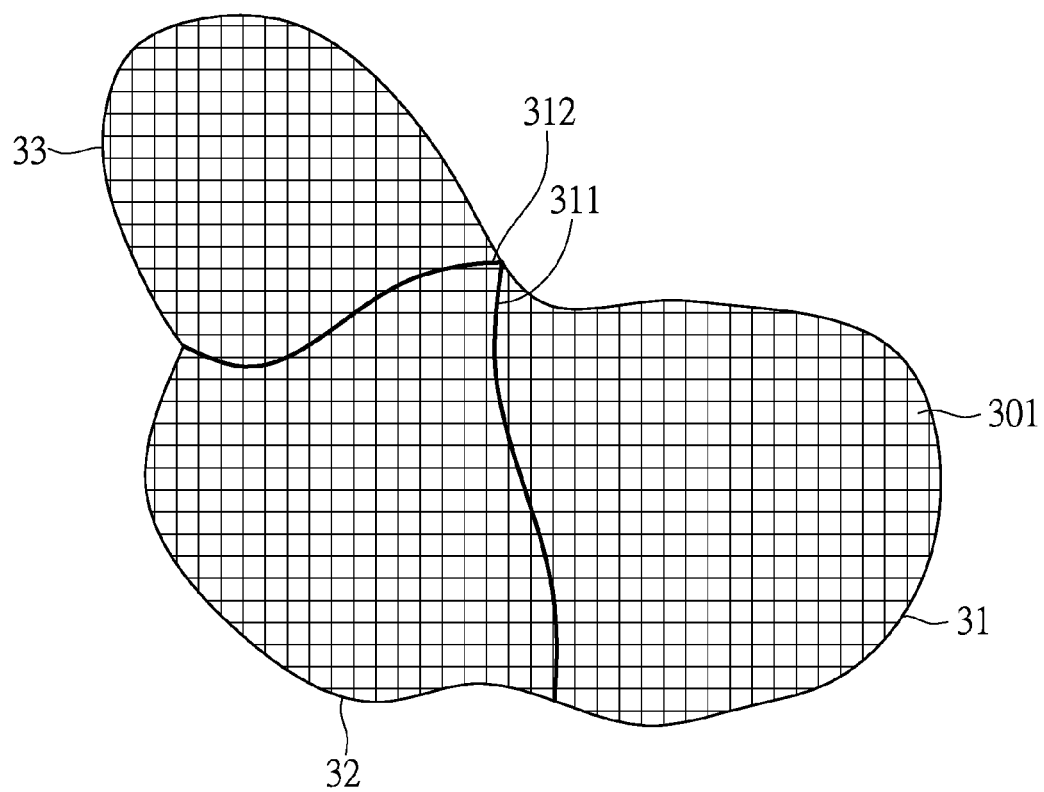
FIG. 3 shows a schematic diagram depicting the recognition of the color blocks in a frame of the video in the method in accordance with the present invention.

Reference is made to FIG. 3 schematically showing the method for distinguishing the blocks in one embodiment of the present invention. The schematic diagram shows a specific region in one frame of the video. The region is composed of a plurality of pixels in an array form.

In one embodiment of the present invention, the image feature of every frame is analyzed after the frames are extracted from the video. The image feature indicates similarity distribution of the pixels in the frame. The correlation of adjacent pixels can be valued by a similarity. The pixels can be regarded as one same color block when the similarities of the pixel are within a threshold. The boundary line between the color blocks can be defined when the similarity of the adjacent pixels meets a larger difference.

According to the present example, the threshold is incorporated to inspect the similarity between the adjacent pixels in a region, and the pixels can be regarded as one same color block because the region of pixels has a certain similarity. On the contrary, the pixels cannot be regarded as the same color block but separated into more than one color block if the similarity between the adjacent pixels exceeds the threshold. For example, as shown in FIG. 3, the separate color blocks 31, 32 and 33 can be identified. Further, the boundary blocks, e.g. the boundary lines 311 and 312, can also be identified and distinguished from the color blocks 31, 32 and 33. After that, a contour of a target object or the color blocks of the target object can be determined according to a result of computation of variances of the color blocks between a preceding frame and a following frame in view of the boundary lines 311 and 312.

When the color blocks 31, 32 and 33 have been defined, every color block is recognized by an ID, e.g. a color block ID, saved to a memory of the mobile device. The pixels within the color block are configured to be associated with this color block ID. The pixels are well positioned in the color block by its associated ID in every frame. The difference of each pixel between the preceding frame and following frame can be calculated.

Figure 4:
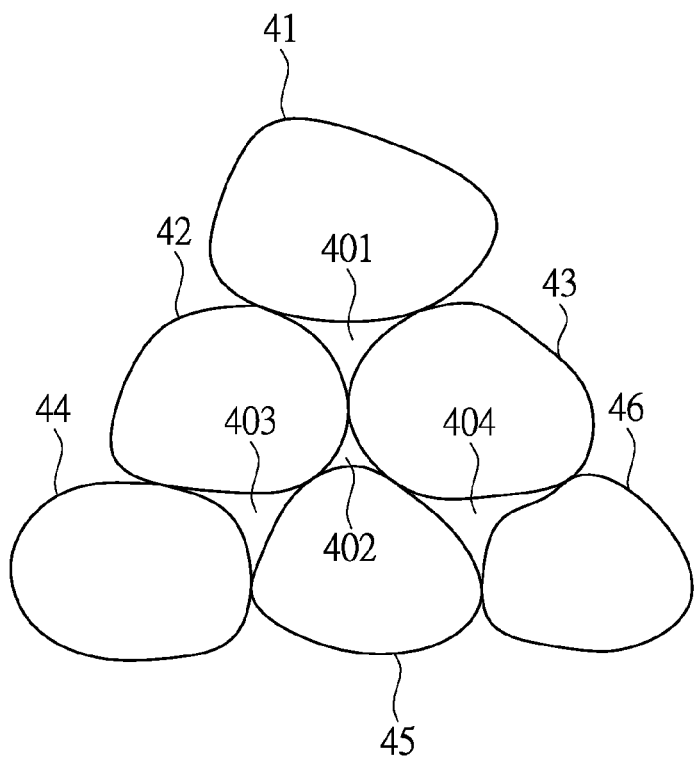
FIG. 4 shows a schematic diagram depicting a step for processing the smaller region among the color blocks in one embodiment of the present invention.

Reference is next made to FIG. 4 schematically showing the method for processing the small area among the color blocks according to one embodiment of the present invention.

A video is shown in the diagram. The plurality of color blocks 41, 42, 43, 44, 45, 46, 401, 402, 403 and 404 are defined based on the image feature extracted from the frame by analyzing the correlation among the pixels in the frame. In an exemplary example, the plurality of frames in the video can be first converted to a hue-saturation-value/luminosity chromatic space before analyzing the image features of the frames. The chromatic correlation between the adjacent pixels can be expressed by a difference of hue (H value), saturation (S value), or luminosity (L value) between the pixels. Alternatively, the correlation may also be denoted by the difference of Hue, Saturation, or a Value in the HSV space among the pixels. The correlation forms the image feature of every frame. Thus, the process operated by circuitry and/or software modules of the system is to classify the pixels with a similar image feature within a region to a color block. In the meantime, a first threshold is referred to for classifying the pixels, as described in FIG. 7. The image of the frame can therefore form the multiple color blocks. The multiple pixels in every color block are associated with the ID of their own color block.

In the diagram, the color blocks 41, 42, 43, 44, 45 and 46 are the relatively large blocks. The smaller color blocks 401, 402, 403 and 404 form the split seams among the large blocks 41, 42, 43, 44, 45 and 46. In one embodiment, a ratio threshold, e.g. the second threshold described in FIG. 7, can be introduced to integrate those color blocks. In an exemplary example, an area difference between the adjacent color blocks is calculated. The area difference indicates either a ratio of areas of every two adjacent color blocks or a difference of areas of every two adjacent color blocks. The area difference is referred to as a ratio threshold or an area threshold. In the step of forming multiple color blocks based on the image feature of each frame, as compared with the second threshold, the color block with a smaller area than another one is regarded as noise when their area difference is larger than the second threshold.

In the memory unit, the identification data of those color blocks with relatively small areas are marked. The process for forming the color blocks may ignore those smaller color blocks, or the smaller color blocks can be merged to their adjacent larger color blocks. Reference is made to the diagram of FIG. 1A, where the smaller seams can be merged to the bricks with relatively small areas, or selectively ignored. After this step, the regions other than the target object can be regarded to be a whole background. This step allows the background of the video to be more conveniently removed.

In FIG. 4, in an exemplary example, the whole background can be regarded as one background image if the color blocks 41, 42, 43, 44, 45 and 46, ignoring the small color blocks 401, 402, 403 and 404, are classified to be a certain range of color tone, saturation and/or luminosity.

Figure 5:
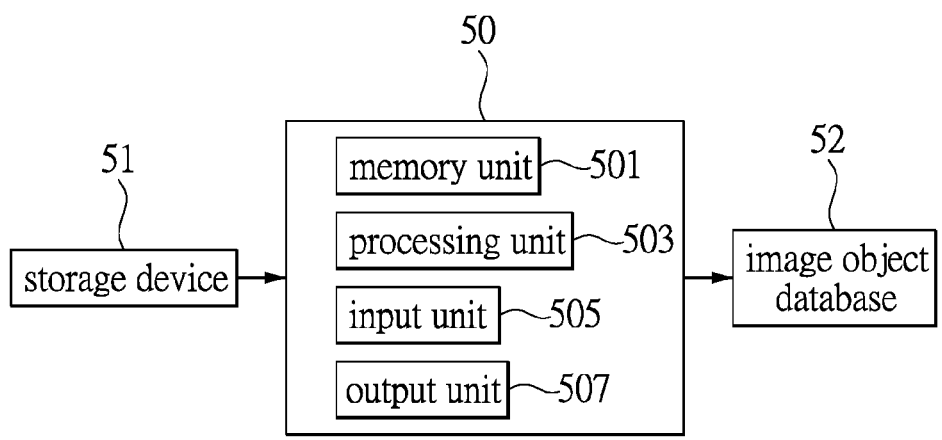
FIG. 5 shows a diagram of circuit blocks for describing the system for removing background of a video in one embodiment of the present invention.

FIG. 5 next shows a diagram of circuit blocks of the system according to one embodiment of the present invention. The system is operated by hardware or adding the software functions in a computer system. The system can be operated using a portable device that can remove the background of the video created instantly anytime so as to keep the target object. The target object is such as a video clip that can be applied for other purposes. The target object can be the main object for another video.

Further, a storage device 51 is such as a storage device or a memory in a computer system, or an external storage. The storage device 51 is used to store the video. Then the computer system 50 takes the video and performs the method for removing the background of the video by operating the circuits and/or the software modules. A video clip extracted from the video is then created.

The computer system 50 utilizes the circuit components to implement removing the background of the video. The circuits include a memory unit 501, one or more processing units 503, an input unit 505 and an output unit 507. The circuit components are electrically interconnected. The computer system 50 retrieves the video from the storage device 51 via the input unit 505. The video is under processing by the one or more processing units 503. A plurality of frames can be extracted from the video, and the images of frames are temporarily stored in the memory unit 501. The image feature of the image of each frame is analyzed, and the image feature is referred to, to form the color blocks. The memory unit 501 also stores an ID assigned to each color block, and the information of pixels associated with the ID. By the one or more processing units 503 recognizing the variance of the blocks among the continuous frames, e.g. the variance between the preceding frame and the following frame, the system analyzes the images stored in the memory unit 501 so as to determine the target object in the video. The system outputs the result via the output unit 507.

The output target object can be stored either to the storage device, or to an image object database 52. The database 52 stores a plurality of motion image files including the video clips with transparent backgrounds, and those video clips can be applied to various applications.

In one embodiment, the memory unit 501 is electrically connected to the one or more processing units 503, and is used to store an instruction set that is executed by the one or more processing units 503 to perform the method for removing background of a video. The process is exemplarily described in both flow charts shown in FIG. 6 and FIG. 7.

Figure 6:
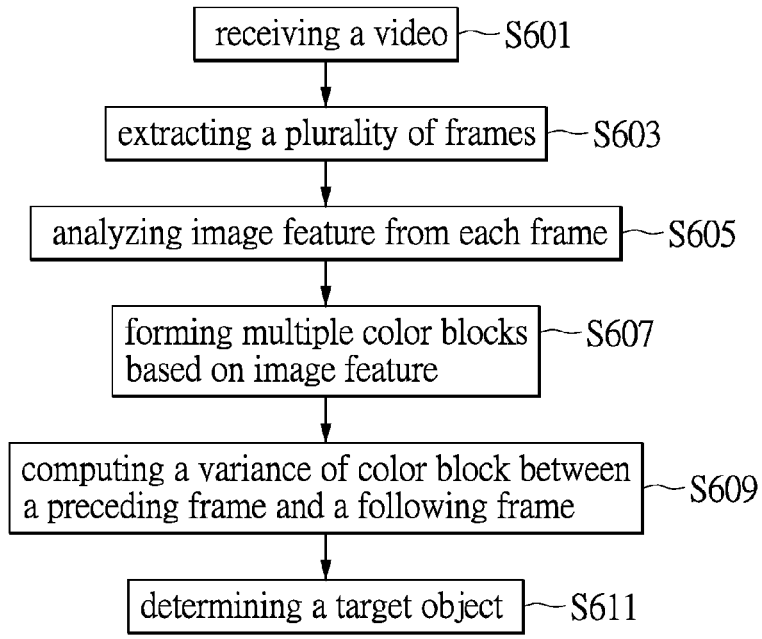
FIG. 6 shows a flow chart describing the method for removing background of a video according to one embodiment of the present invention.

Reference is made to FIG. 6 showing a flow chart describing the method in accordance with the present invention. The method can be performed in a computer system, and the process refers to the schematic diagrams shown in FIG. 1A through FIG. 1C, and FIG. 2A through FIG. 2D.

In the beginning, at step S601, the system for performing the process of removing background of the video retrieves a video from a storage device. The video is generally composed of multiple frames. The frames can be extracted from the video by an image processing method. At step S603, the images of frames are generated and temporarily saved to a memory of the computer system. In step S605, in the system, the image feature of every frame can be obtained by an analysis process. One of the objectives for acquiring the image feature is to classify the pixels in every frame. The linking pixels with similar image feature, through a threshold inspection, can be classified to several larger color blocks for defining the target object.

To analyze the image feature of each frame, a correlation between every two or more adjacent pixels in the frame can be obtained. In the first phase, the pixels can be converted to a specific chromatic space. For example, the pixels in the Red-Green-Blue space can be selectively converted to, but not limited to, a Hue-Saturation-Luminosity/Value space before the step of analyzing the image feature of each frame. The mentioned image feature is such as a correlation regarding hue, saturation, and/or luminosity/value/brightness. The correlation renders the image feature of the frame.

At step S607, one or more color blocks can be defined in each frame based on the state of image features of pixels over the frame. Every color block is assigned with identification data, e.g. the color block ID, that is stored to the memory. The color block is associated with multiple pixel values that are stored to the memory. Since the identification data is associated to every color block, every pixel is associated with its corresponding color block having its unique identification data. That means the memory stores the IDs for the color blocks and the pixels in the frame are associated with the IDs. Next, at step S609, the system computes a difference of the pixel values within every color block in the continuous frames, or between a preceding frame and a following frame, so as to obtain a variance of each color block. The variance for each color block is exemplarily a statistical value of the differences of the pixel values within every color block between the preceding frame and the following frame. The statistical value denotes the variance of the color block. In response to the variance of the color blocks between the preceding frame and the following frame, a target object can be determined, in which, one color block or more connected color blocks covered by the target object can be obtained, at step S611. For every frame, the contour of the target object can therefore be acquired. The identification data of the one or more color blocks covered by the target object are jointly saved to the memory.

The subsequent steps are to set the color blocks other than the color blocks covered by the target object to be transparent blocks, or configured to be a fixed value. In an exemplary example, the color blocks other than the color blocks of the target object are set at zero or a fixed value for creating a video clip without background image. It is noted that the transparent block is defined to be the removable block using a specific software tool. The video clip through the process of removing its background is available to be combined with other static or dynamic backgrounds. The software tool is able to recognize the background image set to be zero or a fixed value that allows the system to create the video clip without background.

In the above steps, to determine the one or more color blocks in the continuous frames of the video, a threshold is introduced to distinguish the blocks and find the pixels of each block. Another threshold can be employed to neglect the smaller color blocks. While the system computes the variance of the color blocks in the frames, one further threshold is introduced to inspect the relative variance among the color blocks so as to determine the foreground color block(s) and the background color block(s). In an exemplary example, the foreground color block(s) can be regarded as the target object. The configuration of the target object can be applied to the original video for creating the video clip alone against the background.

Figure 7:
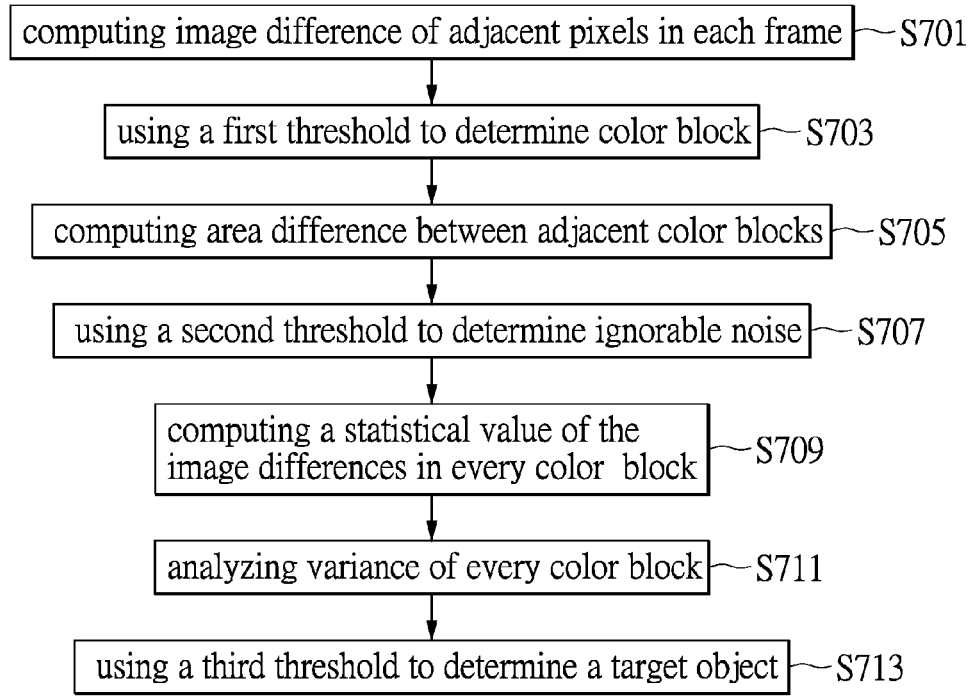
FIG. 7 shows another flow chart describing the method for removing background of a video according to one further embodiment of the present invention.

Reference is made to FIG. 7 showing a flow chart describing introducing several thresholds to process the method for removing background of a video in one embodiment of the present invention.

At step S701, a plurality of frames is extracted from a video. The frame images are temporarily stored to a memory of the system. An image difference between the adjacent pixels in every frame is computed. The image difference among the pixels indicates a single-color difference, a hue difference, a saturation difference, or a luminosity/value difference among the pixels, or any combination of the kinds of differences for the pixels. Next, such as in step S703, the image difference between the adjacent pixels is compared with a first threshold. The first threshold can be a difference range. The pixels are classified to one color block when a pixel difference between the pixel values of every two adjacent pixels is within a first threshold. Therefore, the color blocks within the frame can be determined. It is noted that the first threshold is an adjustable value depending on the practical situation. The first threshold allows the system to more accurately determine the color blocks for the target object.

In the step of forming the color blocks from the frame image, the higher image complexity results in more complex color blocks, and the more complex color blocks cause the high complexity of the image processing process. The system of the present invention simplifies the image processing process, as shown in step S705, by integrating the color blocks. For example, the system calculates an area difference or an area ratio between every two adjacent color blocks in a frame. At step S707, a second threshold is introduced to inspect whether or not the area difference or the area ratio between the adjacent color blocks is too large. If the area difference or the area ratio is larger than the second threshold, the color block with a smaller area is regarded as noise that can be neglected. In an exemplary example, the pixels of the color block with the smaller area can be marked in the memory, and those pixels are neglected in the computation; alternatively, the color block with the smaller area can also be merged to its adjacent larger color block. After this step, the number of color blocks can be reduced, and the frame merely includes the relatively large blocks.

The images in the video clip from frame to frame meet a certain degree of change, as shown in step S709. The system then computes pixel variances in every color block among the frames. The variance for each color block is a statistical value of the differences of the pixel values within every color block between the preceding frame and the following frame. The statistical value is such as an average. An average of the pixel variances of every color block represents an overall variance of the color block. At step S711, the system analyzes the variances of the color blocks in the frame for determining which color block(s) have higher dynamics, and which color block(s) have lower dynamics.

The variance or dynamics of each color block act as the reference to determine the target object through an inspection made by a third threshold. At step S713, the variances of the color blocks are individually compared with the third threshold, one or more linking color blocks with larger variances as compared with the third threshold can be regarded as the target object. Moreover, the smaller variances of the color blocks as compared with the third threshold can also be regarded as the target object. Alternatively, the third threshold is such as a range used to determine the target object. For example, the color blocks become a big block if the variances of the color blocks between the preceding frame and the following frame fall within the range. The target object can be found if the variances of the color blocks of the big block are larger than the third threshold. In one embodiment, the third threshold is such as a distance threshold. A displacement distance of a color block between the preceding frame and the following frame renders the variance of the color block. Any color block within the target object can be identified when the displacement distance of the color block has been compared with the distance threshold.

In an exemplary example described in FIG. 1A through FIG. 1C, the objects (101, 101', 101") are the image objects with larger dynamics as compared with the background image, e.g. the brick 103. The color blocks classified as the background have similar dynamics. At step S713, one or more color blocks with larger dynamics can be found as compared with the third threshold. In the example shown in FIG. 1A through FIG. 1C, the color blocks with relatively large dynamics are integrated to be the target object.

References are made to FIG. 2A through FIG. 2D showing a video 20 having a foreground object 201 and a background motion picture 203. The color blocks 201a, 201b and 201c that have relatively high dynamics are classified as the foreground. The color blocks 201a, 201b and 201c can therefore be merged into one object, e.g. the target object, having a contour. The remaining color blocks 212, 213, 214, 215 and 216 are classified as the background. These color blocks 212, 213, 214, 215 and 216 may have similar dynamics that allows the system to accurately determine the portion of the background of the video. The target object is therefore retrieved.

It is worth noting that the color blocks of the target object may be blocks with relatively small dynamics and the blocks of the background may have relatively high dynamics. The third threshold allows the system to acquire the one or more color blocks that belong to the target object.

Moreover, the target object in general can be successfully extracted from the video by means of the process of removing the background of a video. However, if the images of the original video have high complexity, the system may have difficultly determining only one target object. The method also provides a computer input method for the user to manually decide the blocks configured to be the target object.

The input device for the input method can be a touch-sensitive display, a computer mouse, a keyboard, or a stylus. The input method allows the user to flexibly adjust the parts belonging to the target object, including removing a block from the system-defined color blocks of a target object, or adding a block to the target object previously defined by the system. After that, the color blocks out of the contour of the target object are regarded as the background desired to be removed.

The embodiments disclosed in the disclosure are also directed to a computer-readable storage device storing an instruction set that is executed by one or more processors for performing the process exemplarily described in FIG. 6 or FIG. 7.

While the target object is produced by the process of removing background of the video in any of the previous embodiments of the present invention, the system initiates a software tool allowing the user selectively to add one or more color blocks into the target object, or remove one or more color blocks from the target object via a user interface. A customized target object is therefore created.

Figure 8A:
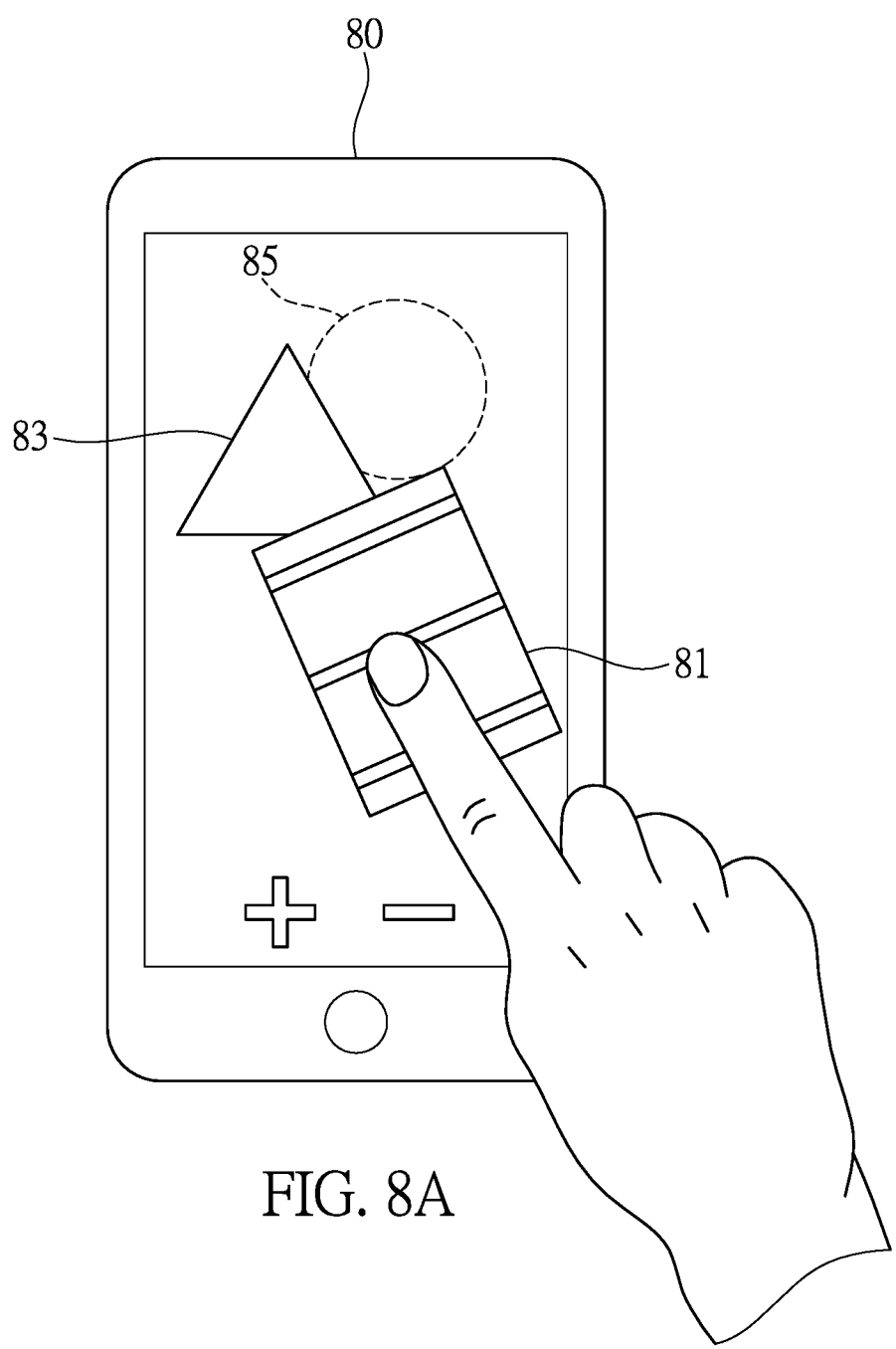
FIG. 8A and FIG. 8B show the schematic diagrams depicting the method allowing adding or removing color blocks of the target object in one embodiment of the present invention.

Reference is made to FIG. 8A schematically depicting the above process of adding or removing color block from the target object according to one embodiment of the present invention. This software tool that operates in the system of the present invention is implemented by the computer system having a touch-sensitive display or a specific user interface.

The software tool of the computer device 80 initiates a user interface exemplarily shown in the diagram of FIG. 8. Through a touch-sensitive display or a user interface, the system renders a function for the user to flexibly add or remove the color blocks. The computer device 80 shows a target object, schematically covering a first color block 81 and a second color block 83. A dotted-line surrounding third color block 85 indicates the removing block is originally a part of the target object.

There are some interface interfaces, such as the icons "+" and "−" appearing at the bottom of the screen, allowing the user to add or remove block by a click action, or a sliding gesture. After the target object has been determined, the system receives the commands through the user interface such that the user adds one or more color blocks to the target object, or removes one of the color blocks from the target object so as to create a new target object.

In an exemplary example, for adding the color block into the target object, the user is allowed to select one specific region/color block within a hue range of the frame image by a point gesture. The user is also allowed to add the color blocks within another hue range using a sliding gesture. It is noted that the sliding gesture can be used to select more than one color block to be added to the target object since a finger can slide over a range that can cover more than one color block. For removing the color block from the target object, the point gesture still works for selecting one of the color blocks within a hue range from the target object; moreover, the sliding gesture can be used to remove more than one color block from the target object since the sliding gesture can cover more than one color block.

It is noted that, for an example of using the touch-sensitive display, if the point gesture causes a touching range on the display, the system will only regard the center of the touching range to be the touching point. The touching point allows the system to decide a corresponding hue value. The hue value renders a broader hue range because the system acknowledges that the touching point may generate insufficient samples of hue values. Therefore, the broader hue range allows the system to decide the adding or removing color blocks within the hue range selected by the user. On the contrary, the sliding gesture means the user's finger slides for a distance over the touch-sensitive display. When the system receives the hue values along the sliding range made by the user's sliding gesture, the system can obtain sufficient samples of hue values, but is preferably reduces the hue range since the system may obtain too many color blocks with hue values that the user has not added or removed.

Figure 8B:
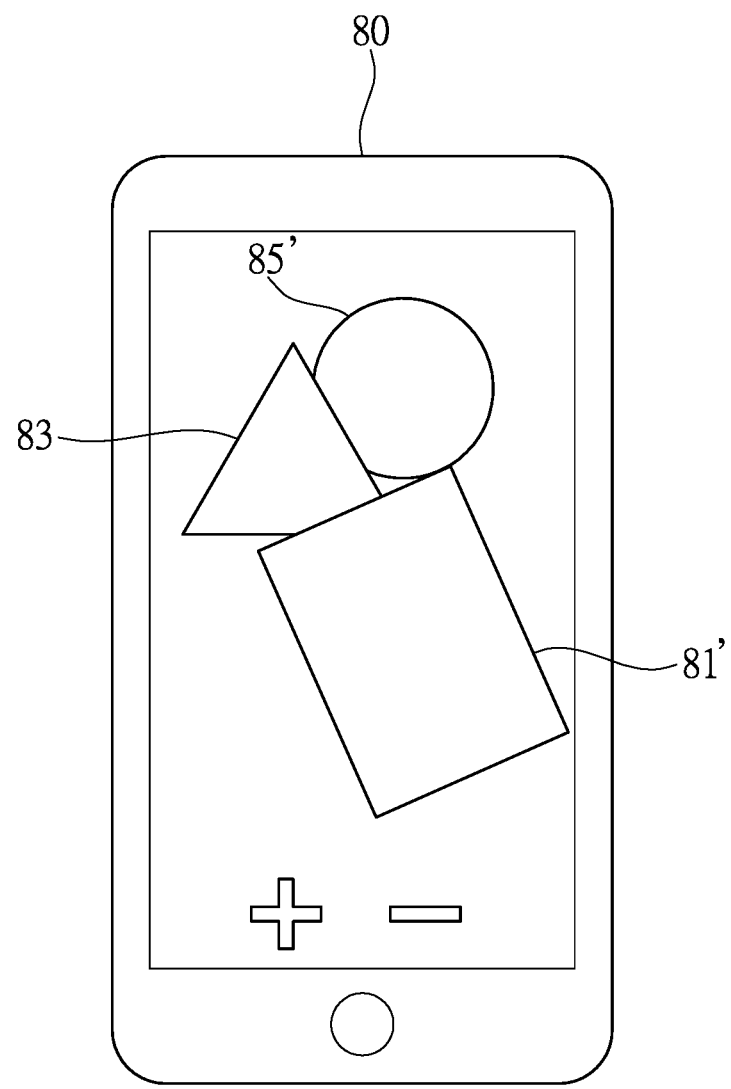

Next, referring to FIG. 8B, for removing the color blocks from the target object, some line blocks of the first color block 81 of FIG. 8A are selected to be removed through the gesture. The updated first color block 81' is shown in FIG. 8B. Further, for adding the color block into the target object, the first color block 85 of FIG. 8A was previously not the part of the original target object, but it is now selected to be added to the target object by the gesture. In FIG. 8B, the third color block 85' is included in the updated target object.

The system thereby provides a flexible solution allowing the user to adjust the target object through the user interface with operations of hardware/software of the system.

Figure 9:
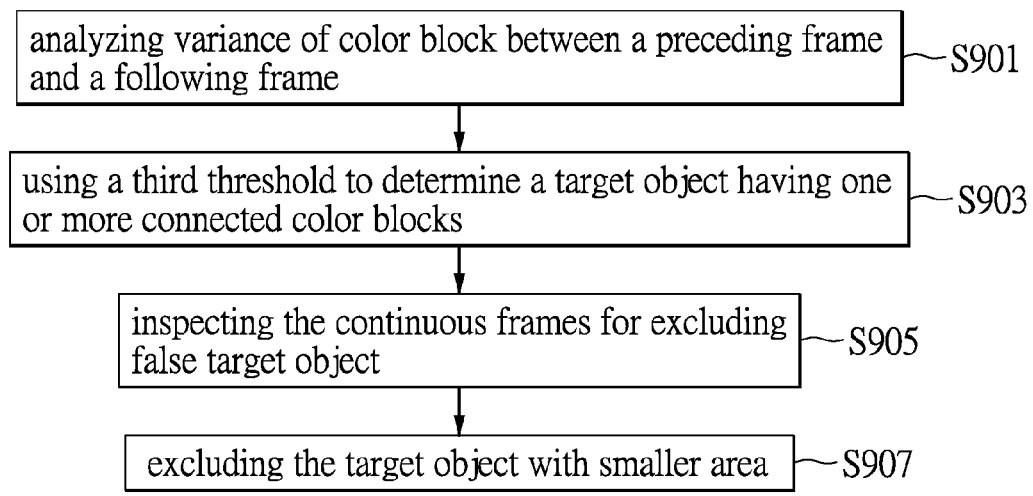
FIG. 9 shows one more flow chart describing the method for removing background of a video according to one more embodiment of the present invention.

FIG. 9 further provides a flow chart for describing a process of obviating the possibility of misjudgment of the target object in one embodiment of the present invention.

The following steps show the process to eliminate the color block that is wrongfully determined as one target object in the rare possibility that more than one target object has been found by the above embodiments of the present invention.

In one embodiment, the color blocks have been determined in a frame of the video. At step S901, the variances of the blocks among the continuous frames can be analyzed. At step S903, a third threshold is introduced to inspect one or more linking color blocks forming the target object. However, more than one target object may be determined if multiple separate color blocks satisfy the condition using the third threshold. As in step S905, the misjudged target object can be found when the system inspects the blocks temporarily appearing in the continuous frames of the video and sets these temporary blocks as the transparent block actively. Alternatively, in step S907, the system can also compare the areas of the plurality of blocks, and set the block with the largest area as the target object but neglect the smaller blocks as the transparent blocks.

According to the above embodiments of the present invention, the method is preferably operated in a computer system, and the target object can be extracted from the video by means of hardware and/or software modules. The target object is such as a video clip without background. First, the images of frames of video are processed to be color blocks, and the target object can be determined due to the variances of the color blocks in the continuous frames. Then the foreground and the background images of frames of the video can be separated. Rather than the conventional technologies, the present invention provides a fast and not costly solution, and will not consume too much resources of computation. It is suitably applicable to applications using the mobile device.

It is intended that the specification and depicted embodiment be considered exemplary only, with a true scope of the invention being determined by the broad meaning of the following claims.

What is claimed is:

1. A method for removing background of a video, comprising:

receiving the video from a storage device;

retrieving a plurality of frames from the video, every frame is buffered in a memory of a computer system;

analyzing an image feature of each frame, and acquiring correlation between adjacent pixels in each frame;

forming multiple color blocks based on the image feature of each frame, wherein identification data associated with every color block is stored in the memory; the pixel values are saved to the memory, and every pixel is associated with a corresponding color block having its unique identification data;

computing a difference of the pixel values within every color block between a preceding frame and a following frame to obtain a variance for each color block;

in response to the variance of the color blocks between the preceding frame and the following frame, determining a target object including one or more connected color blocks; for every frame, the identification data of the one or more color blocks covered by the target object are jointly saved to the memory; and setting the color blocks other than the color blocks covered by the target object to be transparent blocks.

2. The method as recited in claim 1, wherein, before the step of analyzing the image feature of each frame, the plurality of frames is converted into a hue-saturation-value/luminosity chromatic space.

3. The method as recited in claim 1, wherein the pixels are classified to one color block when the pixel value difference of two adjacent pixels is within a first threshold.

4. The method as recited in claim 3, wherein, in the step of forming multiple color blocks based on the image feature of each frame, an area difference between every two adjacent color blocks is computed; the color block with a smaller area is regarded as noise when the area difference is larger than a second threshold.

5. The method as recited in claim 3, wherein the variance for each color block is a statistical value of the differences of the pixel values within every color block between the preceding frame and the following frame.

6. The method as recited in claim 5, wherein the variance for each color block is compared with a third threshold, and the target object having one or more connected color blocks is obtained.

7. The method as recited in claim 6, wherein the color blocks other than the color blocks of the target object are configured to be a background image of the video; alternatively, the one or more color blocks with smaller variance as compared with the third threshold are configured to be the background image.

8. The method as recited in claim 7, wherein the variance for each color block between the preceding frame and the following frame is obtained by calculating a displacement distance of the same color block between the preceding frame and the following frame; and the third threshold is a distance threshold.

9. The method as recited in claim 8, wherein the plurality of frames is converted to a hue-saturation-value/luminosity chromatic space before analyzing the image features of frames.

10. The method as recited in claim 9, wherein the image feature of the frame is an image variance of hue, saturation, value/luminosity, or a combination thereof between adjacent pixels in the frame, so as to acquire a state of hue, saturation, or value/luminosity of the pixels in every frame.

11. The method as recited in claim 10, wherein the color blocks other than the color blocks of the target object are set to zero or a fixed value for creating a video clip without background image.

12. The method as recited in claim 11, wherein, after the target object has been determined, a user interface is provided to add another color block to the target object, or to remove one of the color blocks of the target object so as to create a new target object.

13. The method as recited in claim 11, wherein, if more than one color block is classified as the target object, the step for excluding the color blocks other than the targeted color blocks includes:
 inspecting blocks temporarily appearing in the continuous frames of the video, wherein these blocks are set as the transparent blocks; or
 comparing multiple block areas, wherein the block with largest area is set as the target object, and the other smaller blocks are set as the transparent blocks.

14. A system for removing background of a video, comprising:
 one or more processing units;
 an input unit, electrically connected to the one or more processing units, used to receive a video;
 an output unit, electrically connected to the one or more processing units, used to output a video clip after removing background of the video by the system;
 a memory unit, electrically connected to the one or more processing units, used to store an instruction set for performing a method for removing background of the video, wherein the instruction set executed by the one or more processing units is to perform steps of:
  extracting a plurality of frames from the video;
  analyzing image feature of each frame for acquiring correlation between adjacent pixels in each frame;
  in response to the image feature of every frame, forming multiple color blocks of every frame, and every color block includes multiple pixels, every pixel value is associated with an identification data for every correlated color block;
  computing differences of the pixels between a preceding frame and a following frame, so as to obtain a variance for every color block;
  determining a target object in response to the variance of every color block, and acquiring these targeted color blocks or a contour of the target object; and
  setting the color blocks other than the targeted color blocks as transparent blocks, so as to form the video clip without a background.

15. The system as recited in claim 14, further comprising an image object database used to store one or more video clips whose backgrounds are removed.

16. The system as recited in claim 14, wherein the system is implemented by a computer system having a touch-sensitive display and the computer system receives a command made by a gesture for adding or removing one of the color blocks of the target object, so as to create a new target object.

17. The system as recited in claim 16, wherein, a point gesture is used to add or remove one color block within a hue range; or a sliding gesture is used to add or remove a color block within another hue range that the sliding gesture slides over.

18. A computer-readable storage device storing an instruction set, wherein the instruction set is executed by one or more processors for performing the steps of:
 receiving a video;
 extracting a plurality of frames from the video;
 analyzing image feature of each frame for acquiring correlation between adjacent pixels in each frame;
 in response to the image feature of every frame, forming every frame into multiple color blocks, and every color block includes multiple pixels, every pixel value is associated with an identification data for every correlated color block;
 computing differences of the pixels between a preceding frame and a following frame, so as to obtain a variance for every color block;
 determining a target object in response to the variance for every color block, and acquiring the targeted color blocks or a contour of the target object; and
 setting the color blocks other than the targeted color blocks as transparent blocks, so as to form a video clip without a background.

* * * * *